Figure 1:
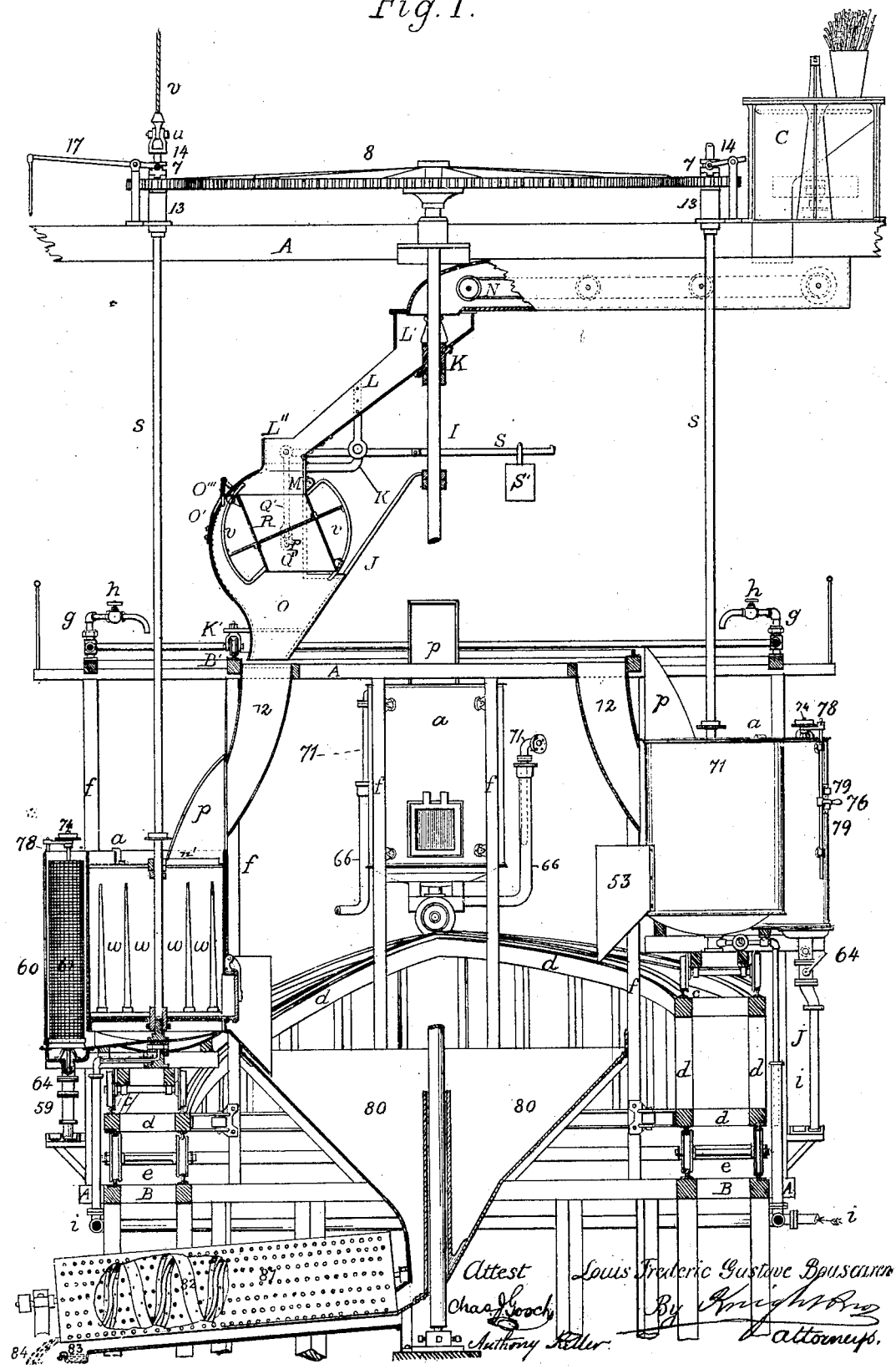

8 Sheets—Sheet 2.

L. F. G. BOUSCAREN.
EXTRACTING SACCHARINE AND OTHER VEGETABLE JUICES.

No. 176,924. Patented May 2, 1876.

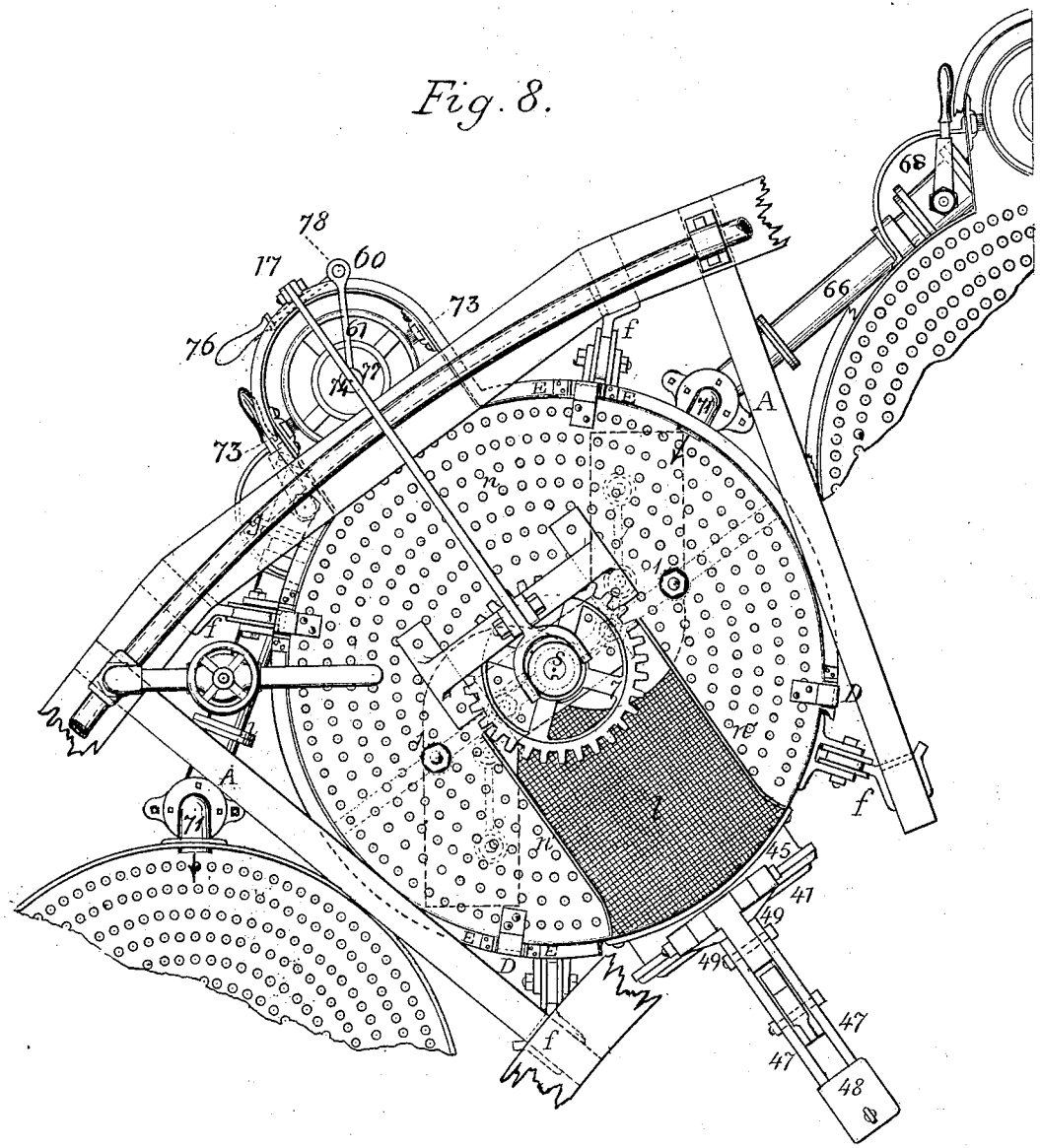

L. F. G. BOUSCAREN.
EXTRACTING SACCHARINE AND OTHER VEGETABLE JUICES.
No. 176,924. Patented May 2, 1876.
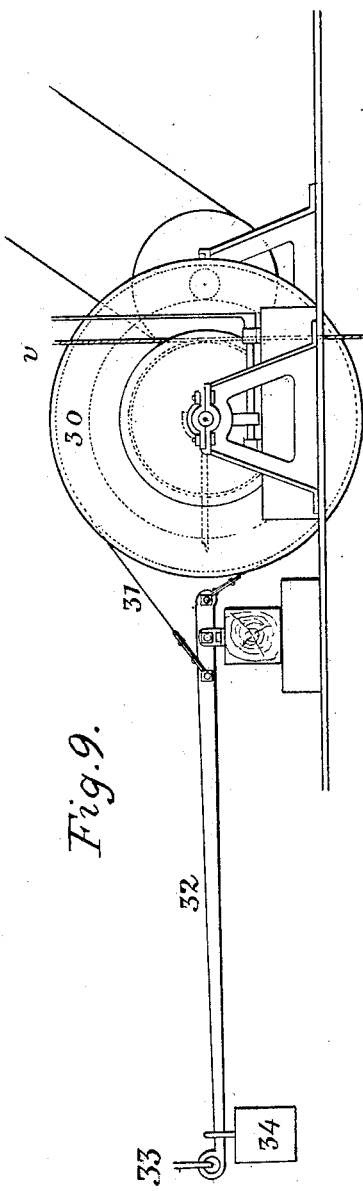
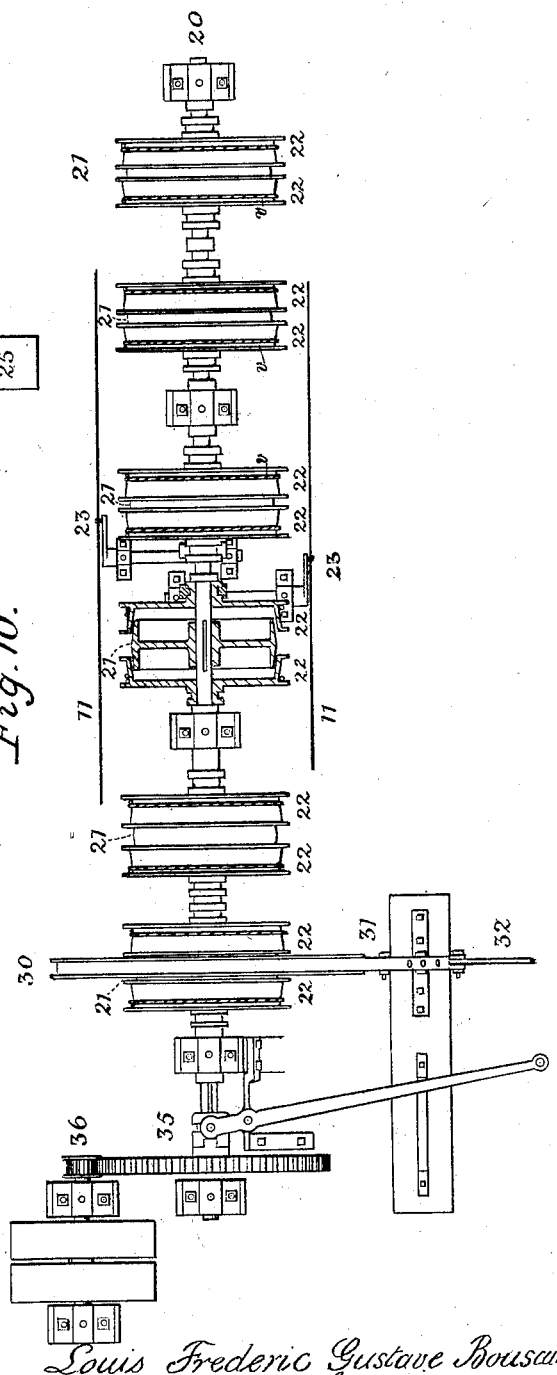

UNITED STATES PATENT OFFICE.

LOUIS F. G. BOUSCAREN, OF CINCINNATI, OHIO.

IMPROVEMENT IN EXTRACTING SACCHARINE AND OTHER VEGETABLE JUICES.

Specification forming part of Letters Patent No. 176,924, dated May 2, 1876; application filed February 12, 1876.

*To all whom it may concern:*

Be it known that I, LOUIS FREDERIC GUSTAVE BOUSCAREN, now residing in Cincinnati, Hamilton county, Ohio, have invented a new and useful Apparatus and Process for Extracting Saccharine and other Vegetable Juices, of which the following is a specification:

The primitive and still prevalent method of obtaining sugar consists, as is well known, in first expelling the sap, (by pressure,) and then in boiling and skimming the same for removal of the water and the grosser impurities; but, even with the defecating and other improvements of more recent times, this customary process yields but two-thirds, or three-fourths, at best, of the sugar contained in the cane. It is, in fact, irrational and unscientific, as a critical examination will readily show.

In the first place, the crushing operation is necessarily incomplete, because pressure alone cannot extract all the moisture, and because a portion of that already expressed is lost by reabsorption into the spongy mass the moment the pressure is removed. Still further loss and waste arise in consequence of the presence in the juice thus obtained of albuminous and other impurities, mostly soluble in water, which, with particles of the tissues, are mixed with the sugar in the juice, which impurities require to be eliminated at a still further sacrifice of crystallizable sugar before the juices can be subjected to the operation of boiling. The more modern so-called "diffusion process," on the contrary, is perfect in principle, and should furnish a solution which, while containing all the saccharine matter at or near the same proportion to water as in the common mechanically-expressed juice, is, nevertheless, free from the impurities of the latter.

In the diffusion process, the washing of the sliced or otherwise comminuted tissue is conducted, from its first introduction into the macerators to its final discharge in a depleted condition, on the principle of gradual enrichment of the liquor, the fresh water first encountering the nearly-exhausted tissue and the fresher charges of tissue receiving always the liquor from those next preceding them in the series, and consequently of less richness, until the liquor, after straining through the freshest charge of tissue, is discharged at the desired saccharine density. The diffusion process, has, however, hitherto failed of general adoption, especially for obtaining of sugar from the sugar cane, owing to the inefficiency of the apparatus and modes of working proposed. To remedy this and to enable the efficient and economical extraction of such juices by the diffusion process is the object of my invention.

In my improved apparatus, the cane or other tissue, as fast as it is sliced, is automatically and promptly conducted, in measured quantities, to each in succession, of a permanently-connected circuit of open macerators, arranged around the source of supply, and subjected to consecutive elevation and depression around the circuit, so as to cause the liquor to overflow by simple gravity from macerator to macerator.

Each macerator has a steam-chamber or other means of heating its contained liquor, in order that the albuminous and other impurities in the freshly-charged cane or other tissue may be promptly solidified within the tissues, and before they have had time to mingle with the sugar.

Automatic elevation and depression of the several macerators is obtained by supporting the entire circuit of macerators upon an annular double inclined track, so connected with the engine as to be slowly and continuously rotated about its axis for this purpose, each macerator being restricted to its proper place, and at the same time guided in its upward and downward movement within the series by vertical guides.

The bottom of each macerator is connected with the top of the macerator next below it in the series by means of a "telescope" or other extensible pipe, whereby constant communication is preserved, notwithstanding the relative changes in elevation.

My improved diffusion apparatus further comprises provisions for agitating the contents of each macerator, so as to bring all parts in equal contact with the macerating-liquor, and to facilitate the proper and equable flow of the same; a series of straining-diaphragms, both stationary and movable, and devices for keeping the meshes of the same open, so as to keep back all mechanically-suspended impurities without interrupting the flow of macerating-liquor; provisions for the temporary elevation of the strainers and agitators, to enable the complete discharge of the spent contents, and the thorough cleansing of each macerator preparatory to a new charge, without interrupting the operation, and a provision for the straining and delivery of the solid refuse.

The general disposition and arrangement of the apparatus are such as to greatly reduce the time and labor. The automatic elevation of the successive macerators enables the overflow to take place by the simple gravity of the liquor in open vessels, from which the interior mechanism can be, at any moment, removed, thus making practicable, without interference with the continuity of the operation, the frequent cleansing and inspection of each and every macerator, and by this means securing exemption from fermentation.

While my invention is believed to be applicable, in its principal features, to the extraction of beet and other vegetable juices, it has been designed and intended by me chiefly for treatment of sugar-cane, and the present illustration and description have specific reference to that process.

Figure 2:
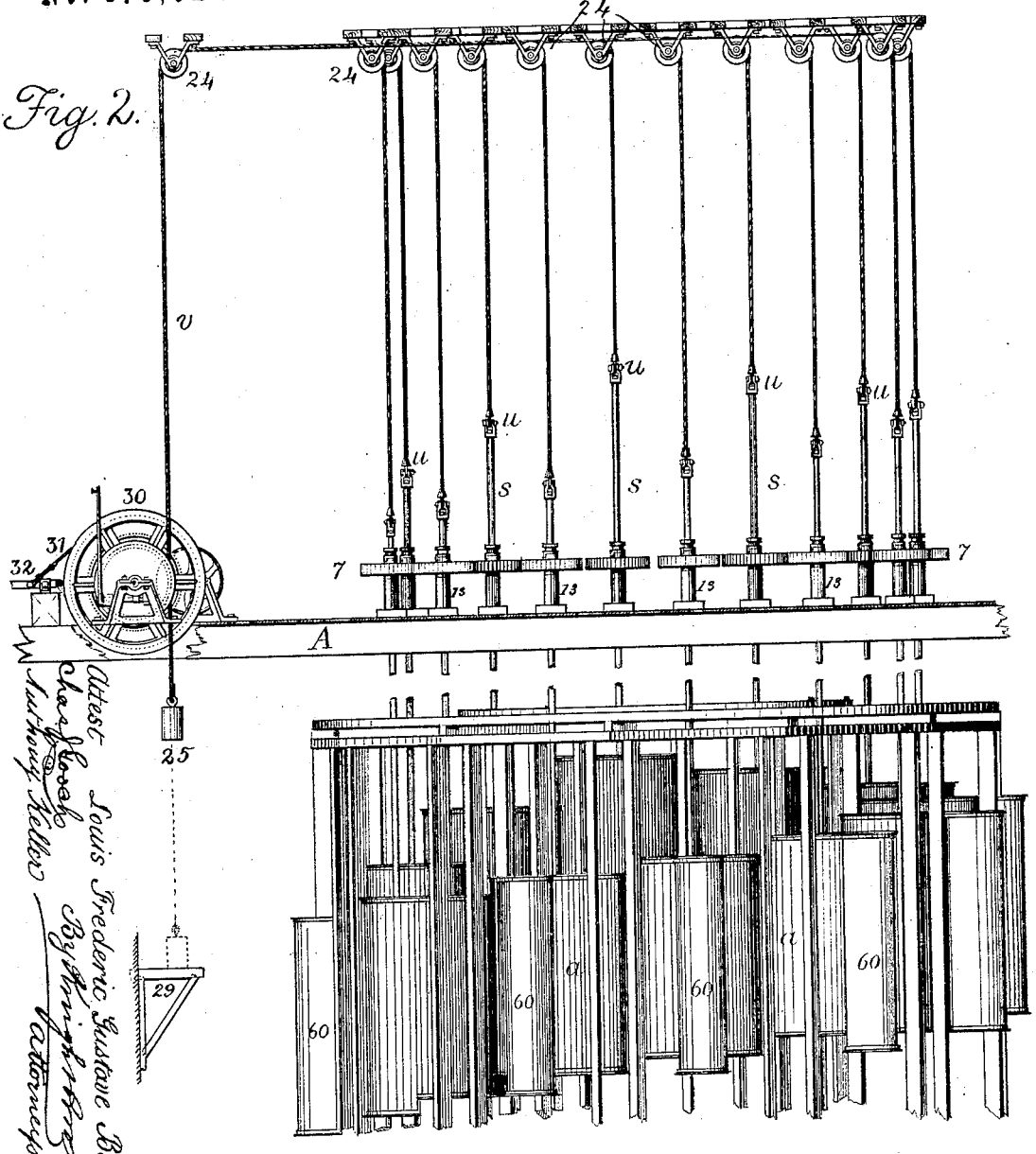
Figure 3:
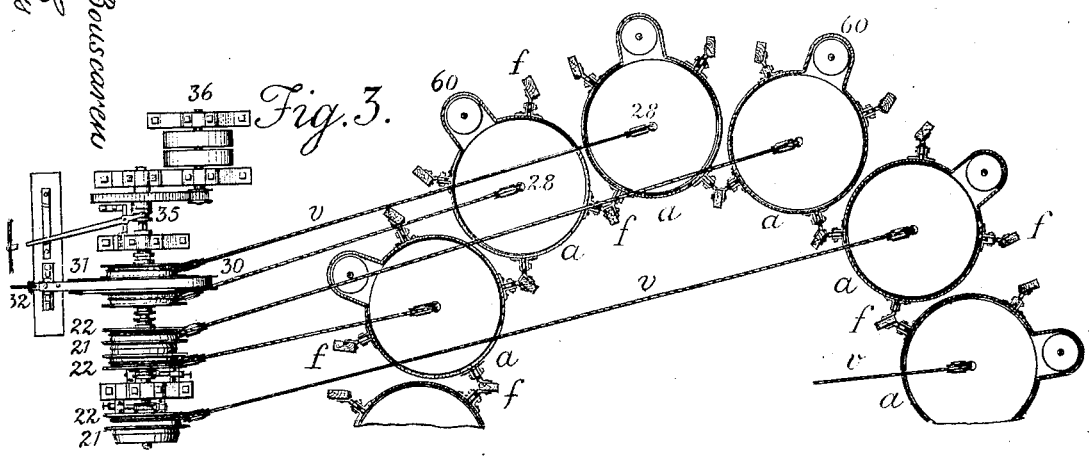
Figure 4:
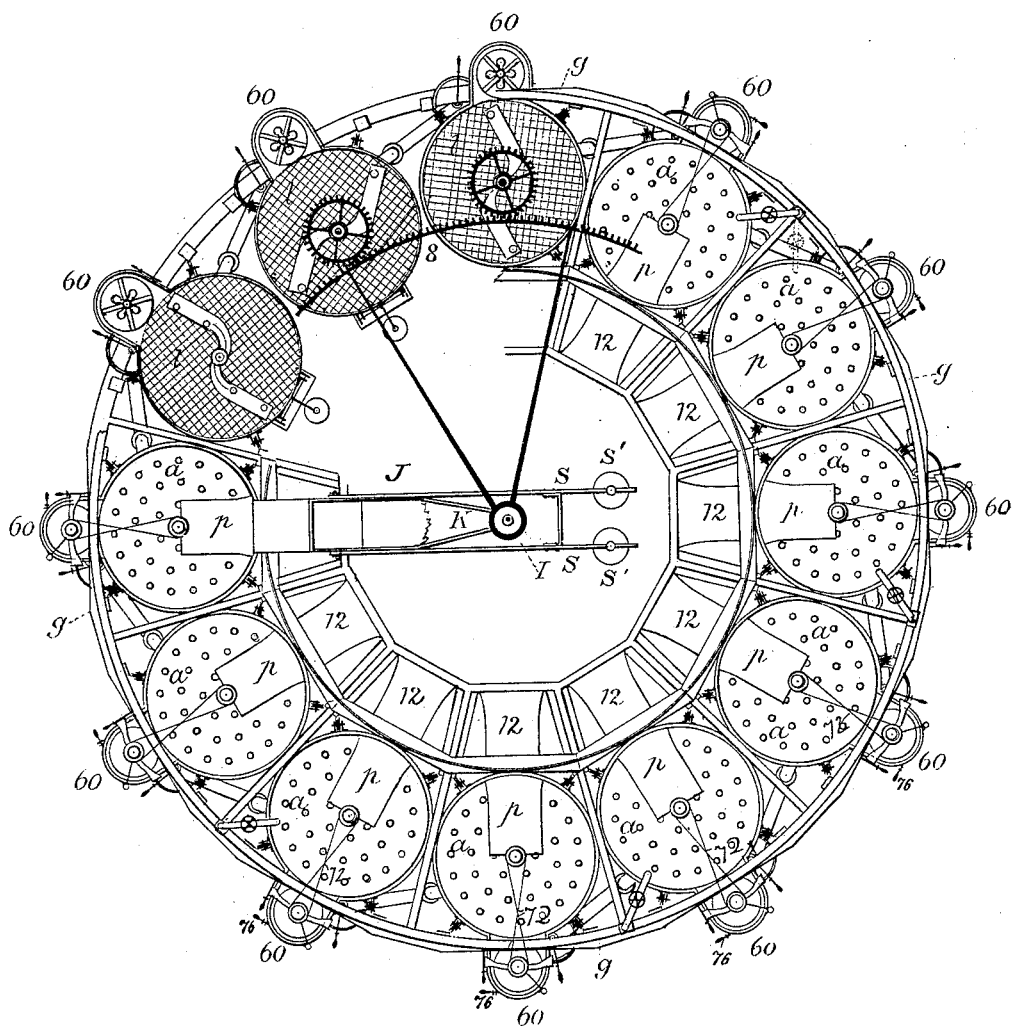
Figure 5:
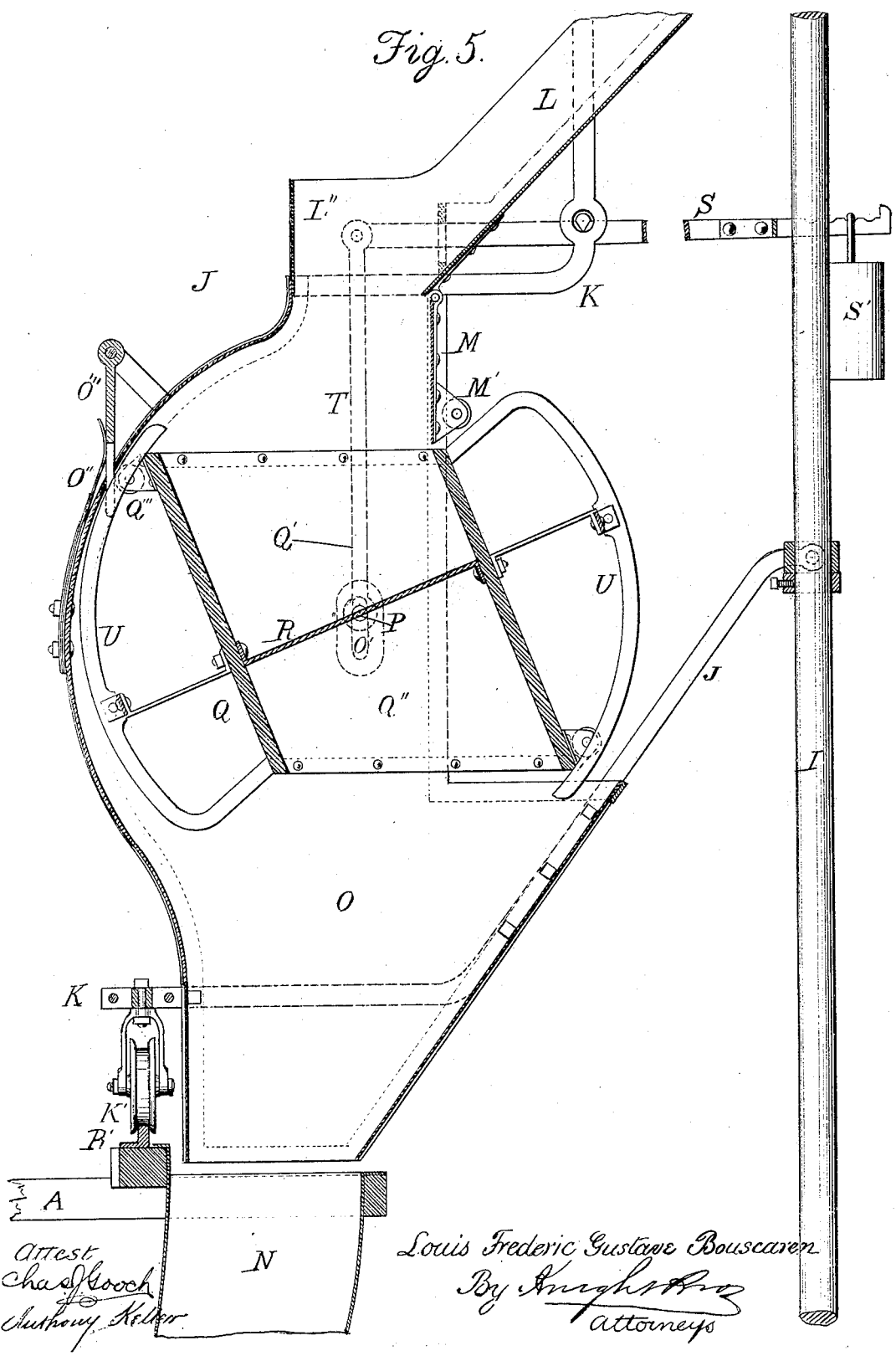
Figure 6:
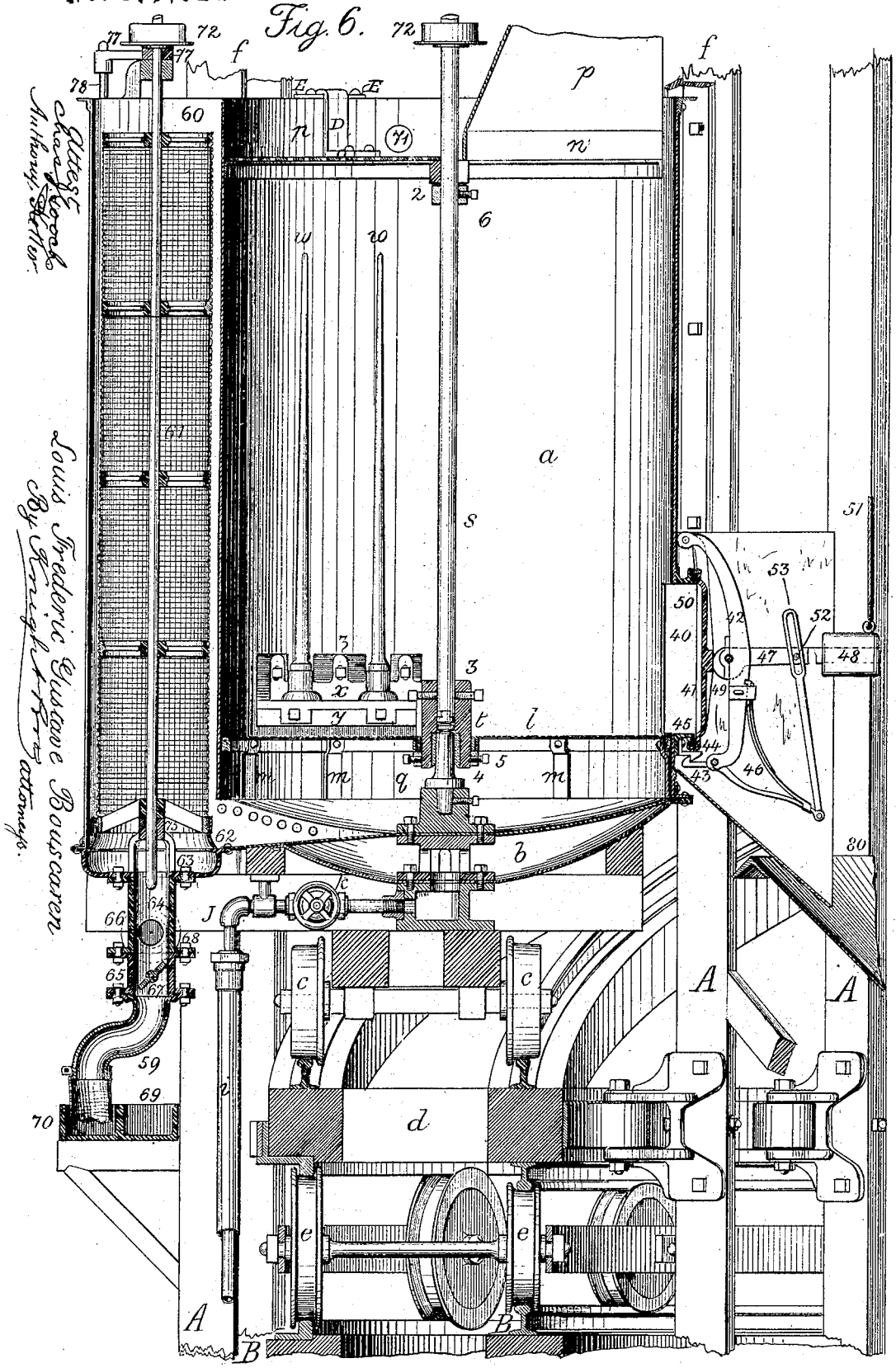
Figure 7:
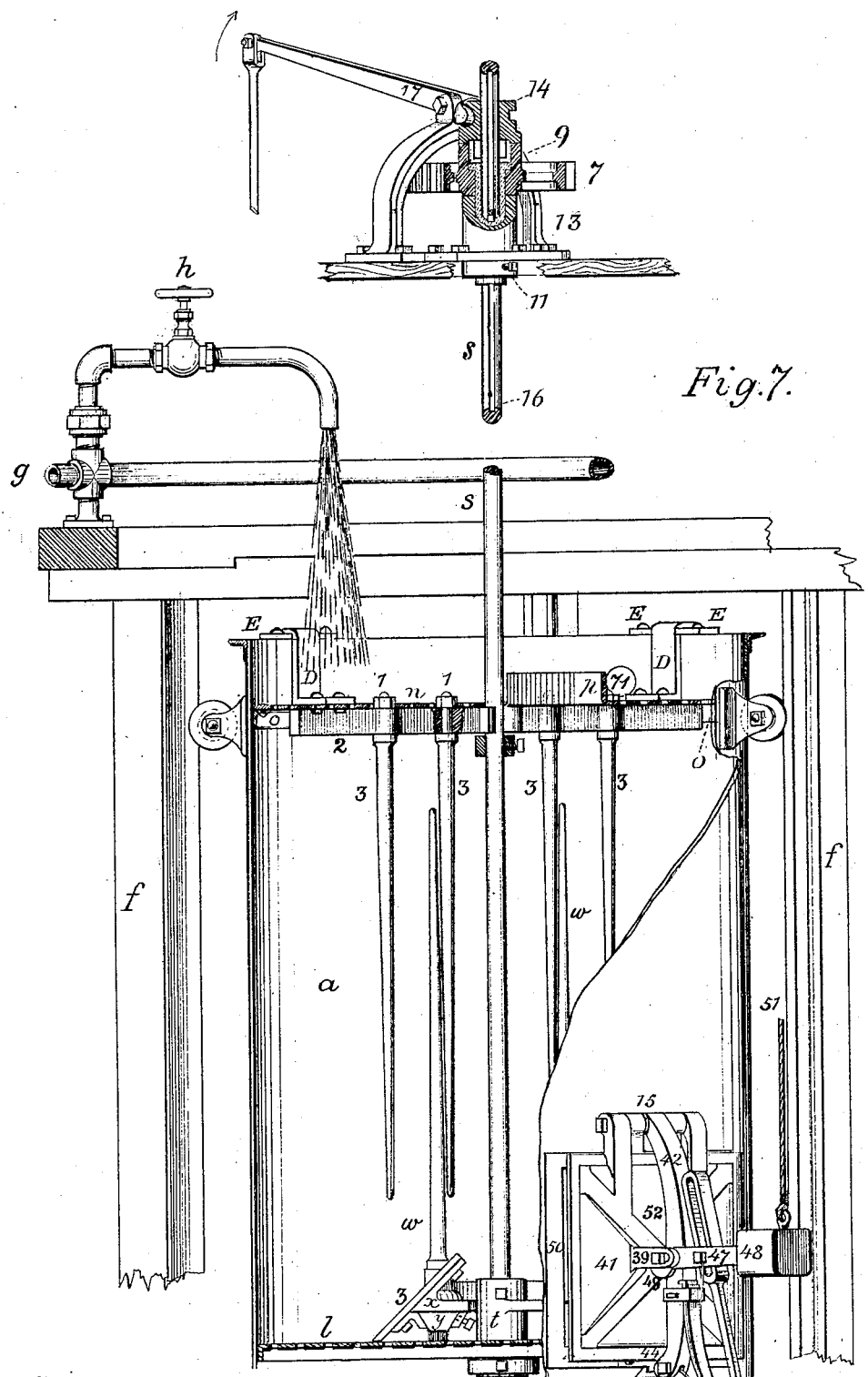

In the accompanying drawings, Figure 1 is a partially-sectionized elevation of my improved macerating apparatus. Fig. 2 shows, in elevation, a group of macerators and their agitator hoisting mechanism. Fig. 3 is a top view, showing a portion of the series of macerators and of the agitator's hoisting cables and apparatus. Fig. 4 is a top view of the group of macerators. Fig. 5 is a vertical section of the mechanism for measuring and charging the sliced cane. Figs. 6 and 7 are axial sections, in two different planes, of a macerator and its accessories. Fig. 8 is a top view of the agitator and one macerator in position with portions of the adjacent macerators. Fig. 9 is an end elevation, and Fig. 10 a top view of a suitable form of hoist for the agitating and straining mechanism.

Of the above figures, the Figs. 1 and 2 illustrate a series of macerators on a double inclined turn-table moving from left to right and Figs. 6, 7, and 8, illustrate a similar series on such a table moving from right to left.

The various operative parts are principally supported by any suitable frame, A, (which may constitute part of the inclosing edifice) and by an annular track, B.

In order to insure prompt, equal, and intimate contact of the macerating-liquor with every part of the cane, the latter is first cut into thin slices and instantly transmitted, in weighed charges, to each macerator, in consecutive succession, around the circuit, by the following means:

C may represent any suitable cane-slicing apparatus. N may represent an endless band, or other suitable conveyer, to conduct sliced cane into the hopper L' of my cane-feeder J.

L is a chute, whose upper end has the form of a cylindrical hopper, L', supported by shaft I, and whose lower end L'' has a valve or hinged bottom, M, and rests upon top of spout O. Spout O is attached to hanger or swivel K. Said spout and hanger are colectively supported on one side by the shaft I, and upon the other side by roller K', upon annular track B', so as to be revolvable at discretion of the operator in a horizontal plane about the common axis of the group of macerators, and above the same. The opposite sides of spout O have each a vertical slot, O', to receive the projecting ends P of a horizontal axle, or pair of trunnions, passing through the center of gravity of the receiver Q. The receiver Q is divided by a partition, R, into two symmetrical compartments, Q' Q'', of which each constitutes, by turn, the receiving-chamber of my automatic weigher and dumper. A pair of steelyards, S, each provided with customary adjustable counter-weight S', are fulcrumed to the swivel K, and, being connected to gudgeons P by rods T, operate to hold the empty receiver Q to its elevated position, as shown in Figs. 1 and 5.

One or more projections, O''', from the spout O operate as a stop or detent, to prevent the rotation of the empty receiver. The said projections are hinged to the spout, as represented, and are held to their normal position by springs O'', so as to yield to the first impact of the receiver, and thus prevent concussion. Q''' is a roller to reduce the friction of the loaded receiver while descending in contact with the detent O'''. U are cams, which, when the receiver is rotating, by turn impinge against a roller, M', on the valve M, and serve to hold the latter shut until the receiver has completed one of its inversions.

The sliced cane is delivered, as measured, into each in succession of a series of hoppers, 12, one to each macerator. These hoppers are affixed to the frame A at such a height as to deliver into their respective macerators at the lowest position of the latter. Each macerator is a vertical cylindrical vessel, a, open at top, and closed at bottom by a heating-chamber, b, which has no communication with the interior of the vessel. The macerators, in number sufficient to carry out the process—twelve in the present illustration—are grouped in a circle, and are supported, by suitable wheels or rollers, upon a double inclined turn-table or rotary platform, d, which itself rests upon, and is guided by, wheels or rollers e, that occupy the annular track B. These macerators are retained, each in its proper place, by vertical guides f while being automatically and continuously elevated through three-fourths of the circuit, and more quickly depressed through the remaining one fourth by the agency of the revolving platform d. g is a pipe, containing water at any desired temperature, and having cocks h, each of which may be caused to discharge into one or more macerators.

*i* is a pipe, for conveying steam to the chambers *b* through the medium of telescope or other extensible branches *j*, having cocks *k*. The extensible construction of the branches *j* is rendered necessary by the constant change of level of each and every macerator.

Each macerator has two removable horizontal diaphragms, of perforated sheet metal, wire-gauze, or other pervious material, to wit, one, *l*, near the bottom, which I call the straining-diaphragm, and one, *n*, near the top, which I call the water-distributing diaphragm.

M D E represent supports, so constructed as to hold the said diaphragms immovable during maceration, and yet to permit of their easy withdrawal in the intervals succeeding maceration, as hereinafter set forth.

On that side of each macerator nearest the common center of the group each head or upper diaphragm *n* has an opening, *n'*, protected by a curb or hood, *p*.

Each macerator has, at bottom and coincident with its axis, a stud, *q*, to support and center the shaft *s* of an agitator, *t*, which may be armed with brushes *y* and scrapers *z* to keep open the meshes of the straining-diaphragm *l*. The agitator-shaft *s* is surmounted by swivel attachment *u* for a cable, *v*, whose remote extremity is connected with a suitable hoist, a form of which will be hereinafter described. Collars 4 and 6, or other suitable projections from shaft *s*, cause the latter, when lifted, to carry with it the entire straining and agitating mechanism of the macerator proper, so as to leave the interior of the macerator entirely clear when desired for inspection, cleansing, or repair. Turning loosely upon the shaft *s*, within a fixed pedestal, 13, (which holds it to a given plane,) is a pinion, 7, which, in common with its fellows upon the shafts of the other macerators, gears with the large central wheel 8 attached to the main shaft I at the common axis of the group of macerators A clutch, 14, having a handle, 17, within reach of the attendant, enables him to lock the pinion 7 of any particular macerator with its shafts *s*, and to thereby put the agitator in motion.

The hoist, for elevating the agitator *t* and the diaphragms *l* and *n*, may be constructed as follows: 20 is a horizontal shaft, attached to which, at suitable intervals, are drums 21, whose number is equal to half that of the macerators. The shape of each drum is that of two symmetrical truncated cones attached base to base. On each side of each drum is a friction-pulley, 22, loose upon the shaft 20, and moved on and off of its drum by means of a lever, 23, put within convenient reach of the operator by means of cord, weight, and pulley, or other suitable means. Around each pulley 22 is wound, by two or more turns, the wire-rope or cable *v*, which is conducted around suitable pulleys 24 to its proper agitator-shaft. The free end of cable *v* carries a weight, 25, sufficient to prevent any slippage of the cable around its pulley 22. The weight of this member 25 may be made sufficient to counterbalance any desired part of the weight of the agitator and diaphragms, so as to reduce the amount of power necessary to lift the latter, and to hold it in the elevated position. A stop or rest, 29, by arresting weight 25 in its descent, causes the cable *v* to slip on its pulley, and makes it impossible to hoist the agitator too high. The shaft 20 is also provided with a brake, 30, whose operating lever, 32, is placed under control of the attendant by means of suitable rope 33, or other device, and has a weight, 34, to hold the brake with force adequate to retain in the elevated position either one of the agitators.

The shaft 20 may be put in and out of gear by means of clutch 35, which may be operated by suitable cord or other device accessible to the attendant. In its normal condition the shaft 20 is at rest with the brake 31 on and all the shiftable pulleys 22 withdrawn from their drums, and turning loosely upon said shaft, following the motion of the descending or ascending macerators.

When an agitator is to be lifted, its pulley is thrown over the friction-drum corresponding to it, the brake-lever is lifted, and the clutch thrown in gear, causing the elevation of the suspended agitator and diaphragms.

When the proper height has been reached by the agitator the clutch is thrown out of gear, and the brake, being applied, holds the agitator in place, all this being done without interfering with the other agitators, whose pulleys remain loose on the shaft 20.

The main refuse-ventage or discharge-opening 40 of each macerator is located with its bottom edge on a level with the straining-diaphragm *l*, and is provided with a hinged door, 41, opening upward. Over the door hangs a wrought-iron yoke, 42, hinged at its upper end to the macerator, and having at its lower end a hinged hook or latch, 43, which catches behind a shoulder or projection, 44, from the neck 45 of the opening 40, and is held in position by a stiff spring, 46. A pair of slotted links, 39, connect the yoke 42 with the door 41. A forked or double lever, 47, also hinged on the yoke 42, and heavily weighted, 48, at its outer extremity, is shaped at its inner extremities into cam-heads 49, which bear on the center of the door 41, and cause the door to press around its entire edge hard on an elastic seat or gasket, 50, which encircles the opening.

By pulling with a shock on cord 51, attached to the end of the lever, a pin, 52, fastened to the lever, and working in a slotted arm, 53, attached to the tail-end of the hook 43, causes the hook to become disengaged, so as to liberate the door 41, which may then be opened to any extent by simply continuing to elevate the cord 51, whose release at any moment reverses the above movements, and restores the door to its closed and locked condition.

Each macerator has a bay or side chamber, 60, whose lower portion communicates with that part of the macerator proper which is underneath the straining-diaphragm *l*.

Journaled axially within the chamber 60 is a revolvable cylindrical strainer, 61, whose lower extremity has an annular lip or cup packing, 62, of leather or other elastic material, to prevent any escape of juice except through the meshes of the revolvable strainer.

An orifice, 63, in the bottom of the chamber 60, affords communication from the interior of the revolvable strainer 61 to a pipe, 64, having two branches, to wit, one, 65, downward, and one, 66, in a lateral direction. These branches have valves or cocks 67 68.

The downturned branch 65 has a turn-spout, 59, which may be directed to discharge into either one of two troughs or conduits, of which one, 69, is for the concentrated juice, and the other, 70, is for the waste water employed to cleanse the macerator after each emptying. The lateral branch 66 extends upward and telescopes onto a second pipe, 71, which is fastened permanently to the next macerator, and discharges into the same over the top of the distributing-diaphragm *n*. The rotation of the cylindrical strainer 61 may be effected by belt and pulley 72, or other connection with the macerator-shaft, or by the hand of the operator. Brushes 73 secured to the inner wall of the chamber 60, operate to sweep the meshes of the revolving strainer clear of obstructions, and to preserve it in an open and permeable condition. The shaft 74 of the strainer 61 is prolonged downward through and below its bottom bearing 75, so as to enable the strainer to be elevated without unshipping it wholly from its socket. This elevation may be effected by arms or handles 76, connected with a collar, 77, upon the said shaft 74, through the medium of a slidable and rotatable rod 78. 79 are stops to hold said handle to either its upper or lower position at will. 80 is a discharge-funnel for the refuse that escapes through the ventage 40. The neck of this funnel may empty into a revolving perforated cylinder, 81, having a spiral rib or flange, 82, which operates to retard the escape of the solid refuse (bagasse) sufficiently to afford time for the liquid portions to strain off through the orifices of the cylinder. The liquor which escapes from the strainer 81 is conducted off by a drain, 83, and is either suffered to escape or is collected in a suitable tank or reservoir for future use. The solid refuse (bagasse) escapes from the end of the strainer 81 into a receptacle, 84, or it may be caught in cars or other vehicles for removal to a drying shed or oven for conversion into fuel. The rotation of the turn-table may be effected by a worm, which gears into an annular rack upon the table.

My above-described maceration and diffusion apparatus is susceptible of being worked in different manners, one of which is as follows: I will suppose the rotation of the turn-table continuous with a velocity of one revolution in two hours, which will give $\frac{120}{12}=10$ minutes for the period of time between two successive positions in the series of one macerator. I will, for the purpose of explanation, designate as macerator No. 1, the macerator which is, for the time being, at the summit of the double incline, and as No. 10 that which occupies its foot. Macerators Nos. 1 to 9 inclusive have, in turn, received and yet retain their charges of cane, and are all full of cane and liquor to the level of their top diaphragms *n*, the cock 68 of all the connecting-pipes 66 being open. No. 1 is receiving cold water from the reservoir through the supply-cock *h*, and overflows into No. 2, which overflows into No. 3, and so on to No. 9, which macerator is, consequently, receiving the liquor that has strained through eight charges of cane of increasing richness. The charge of cane in No. 9 has just been put in, and the charge in No. 1 (one hour and thirty minutes old) is supposed to be entirely exhausted and ready for discharge. The attendant now closes the connection between Nos. 1 and 2, shuts off the supply of fresh water to No. 1, opens it to No. 2, and opens the discharge-door 41 of No. 1, so as to empty the latter.

The cock 67, of discharge-pipe 64 of No. 9, is now opened, and a quantity of liquor equivalent to the quantity of juice contained in one charge of cane is allowed to strain out into the conduit 69, which conveys it to the ordinary evaporating apparatus.

(This liquor, having been strained and worked through nine successive charges of cane, of increasing richness, is supposed to contain the same percentage of sugar as the natural juice of the cane. If, on examination, it be found to contain a less percentage, the velocity of rotation of the turn-table *d* should be diminished so as to increase the length of time of maceration.)

Discharge-cock 67 of No. 9 is then closed and cock 68 opened, so as to cause No. 9 to overflow into No. 10, which macerator should be, at the same time, receiving its charge of sliced cane.

In the meantime No. 1 (which has dropped onto the short incline) is being cleansed and washed, the cylindrical strainer 61, and, if necessary, the agitator *t*, and diaphragms *l* and *n* are elevated, and the water and sediment remaining below the level of door 41, having been run out through the discharge-pipe 64 into conduit 70, and the elevated members replaced, the macerator is ready for another charge.

Ten minutes having elapsed, No. 2 is found at top of the incline, and No. 11 at the bottom, and the foregoing manipulations are repeated, No. 2 taking the place of No. 1, No. 10 the place of No. 9, and No. 11 the place of No. 10, upon the respective portions of the turn-table. In another ten minutes the operation is exactly repeated, No. 3 assuming the functions of No. 2, No. 11 those of No. 10, No. 12 those of No. 11, and so on continuously until the entire supply of cane has been worked up, the (for the time being) uppermost macerator in the series receiving a quantity of pure water equal to its capacity, less the volume which one charge of cane possesses in excess of its contained juice, and the lowest macerator in the series furnishing a quantity of artificial juice equivalent to that of the natural juice in one charge of cane.

The water, when introduced to the series, being cold or at its natural temperature, and only becoming heated when it approaches the place of discharge, whence it passes immediately to the evaporating apparatus, but little loss of heat is incurred. The temperature of the entering water may be regulated at discretion of the operator.

In order to insure the solidification in the tissues of the soluble substances injurious to the sugar, especially of pectin, which is not coagulated by hot water alone, lime or other suitable agent may be added to the water or liquor.

I have selected to illustrate my invention a series of twelve macerators, to make up a group or circuit, of which number there are, at all times, nine consecutive macerators on the ascending track, and which constitute, for the time being, a connected but shifting series whose total difference in elevation is fifty-four inches, and in which each macerator reaches its greatest altitude every two hours; but these numbers, distances, and periods may, of course, be varied as experience may direct; and the ascending and descending grades of the revolving track may be arranged for right rotation, as in Figs. 1 and 2, or for left rotation, as in Figs. 6, 7, and 8.

Each macerator may have a plurality of straining-chambers—like 61—through which the liquor of each macerator may be conducted before entering the succeeding one; and these straining-chambers may either empty consecutively one into the other, or all simultaneously into a common conduit, and any one or more of them may be brought into service, at discretion of the operator, by simply lowering their respective screens.

A sliding sluice-gate may be substituted for the door 41 and its described appurtenances.

The motion of the turn-table may be either continuous, as described, or intermittent.

The spout O may be prolonged downward, so as to discharge directly into the successive macerators, and thus to render the hoppers 12 unnecessary.

The several cocks and other appliances of each macerator may be placed under ready control of the operator by means of suitable cords or otherwise.

Instead of two steelyards and their accompanying counter-balances, a single branched lever may be employed in conjunction with a single counter-weight or a spring.

Grooved lugs which embrace vertical bars may replace the rollers and posts for guiding the macerators, and each macerator may be supported by a single wheel upon a turn-table of one double-incline track, which table may revolve upon a series of rollers in stationary bearings.

The entire system of agitating mechanism, with its neccessary adjunct—the hoisting apparatus—may be left out, and a greater number of macerators used in the circuit, if necessary, thus increasing the number of changes through which the liquor is passed, and the time spent in the maceration of one charge to compensate for the non-agitation of the pulp.

A great simplification of the apparatus, with a corresponding reduction in its cost and in the power necessary to operate it, would by this means be obtained. In such arrangement each macerator may be provided with a wire-gauze basket or other permeable vessel, to receive the cut cane and enable its ready removal when spent.

I have described the process of maceration as immediately succeeding that of slicing, and have arranged a feeding mechanism with especial reference to prompt action of the heated liquor, so as to forestall fermentation, the operation being designed to be conducted upon the plantation itself, or in its vicinity; but it is manifest that if, by desiccation or otherwise, the cane can be placed beyond liability to deteriorate for a period sufficient for its transportation, the macerating and subsequent processes might be performed elsewhere.

My apparatus, while especially designed for operating upon sugar-cane, is manifestly applicable, in its essential features, to extraction of sugar from the beet and other saccharine plants, or to any extractive process in which the diffusion principle is employed.

I am aware that it has been attempted to extract the sweet principle of the beet and of the sugar-cane by maceration of their sliced or crushed particles in water sufficiently hot to solidify the albuminous portions, and at the same time to dissolve the sugar, the same liquor being applied to successive charges of material until the desired strength of saccharine solution has been obtained. Of this kind were experiments, on an extensive scale, made by my father upon his sugar plantations in the Island of Guadaloupe during five years, commencing in the year 1847; also, experiments by Mesmay and others about the same time. I therefore make no claim to such process except as hereinafter specified.

I claim as new and of my invention—

1. The process of obtaining a concentrated extract by the continuous flow of the diffusing liquor through a circular and connected series of open macerators automatically elevated and depressed, the charges therein being heated and agitated at will to facilitate, if need be, the complete diffusion of the substance to be extracted, pure water being continuously fed to the spent charge into the—for the time being—highest macerator in the series, and the concentrated infusion being continuously drawn from the—for the time being—lowest macerator in the series containing the freshest charge.

2. An apparatus constituted substantially as herein set forth, with a circular endless series of macerators automatically and successively elevated and depressed, for the purposes set forth.

3. The circular series of open macerators $a$, having yielding connecting-pipes 66 from the bottom of each macerator to the top of the next, said macerators being mounted upon a revolving double-incline track or turn-table, $d$, for their consecutive and automatic elevation, in the manner and for the purpose set forth.

4. In combination with the circuit of vertically shifted open macerators $a$, the heaters $b$, having yielding connections $j$, with steam-pipe $i$, substantially as and for the purpose set forth.

5. In combination with an open macerator, $a$, the agitating and straining mechanism $s$ $w$ $n$ $l$, with the described or any suitable hoisting apparatus, as and for the purpose set forth.

6. In combination with the open macerator-proper $a$, the straining-chamber 60, inclosing the rotary screen 61, provided with any suitable elevating devices 76 77 78 79, as and for the purpose set forth.

7. The discharging device consisting of door 41, yoke 42, slotted link 39, hooked latch 43, spring 46, weighted and cam-headed lever 47, pin 52, and slotted arm 53, the whole being arranged and adapted to operate as and for the purpose set forth.

8. In combination with the circular series of open macerators $a$, restricted to vertical movement and operated as described, the cane-feeder J, rotable, at will of the operator, about the common axis of such series, as and for the purpose designated.

9. In combination with the open macerators $a$, an automatic weigher and charger, having the following elements: A receiver, Q, with two equal obverse compartments, $Q'$ $Q''$, balanced upon a horizontal axis or pair of trunnions, P, suspended from a pair of graduated counter-balances, S $S'$, an inclosing case or spout, O, a yielding detent, $O'''$, hinged bottom M, and cams U, for the automatic closure of said bottom during the inversion of the said receiver, the whole being arranged to revolve, at will of the operator, about the vertical axis I, and to operate substantially as set forth.

10. The rotating cylindrical strainer 81 in the described combination with the refuse-funnel 80, and with the receptacles 84 and 83 for the spent fiber and waste-water, respectively, substantially as set forth.

In testimony of which invention I hereunto set my hand.

LOUIS FREDERIC GUSTAVE BOUSCAREN.

Attest:
  GEO. H. KNIGHT,
  WALTER KNIGHT.